(12) United States Patent
Brelis et al.

(10) Patent No.: US 6,544,040 B1
(45) Date of Patent: Apr. 8, 2003

(54) METHOD, APPARATUS AND ARTICLE FOR PRESENTING A NARRATIVE, INCLUDING USER SELECTABLE LEVELS OF DETAIL

(76) Inventors: Cynthia P. Brelis, 138 Palisades Ave., Santa Monica, CA (US) 90402; Daniel J. Siegel, 601 23rd St., Santa Monica, CA (US) 90402; Andrew L. Silver, 138 Palisades Ave., Santa Monica, CA (US) 90402; Caroline S. Welch, 601 23rd St., Santa Monica, CA (US) 90402

( * ) Notice: Subject to any disclaimer, the term of this patent is extended or adjusted under 35 U.S.C. 154(b) by 283 days.

(21) Appl. No.: 09/605,138

(22) Filed: Jun. 27, 2000

(51) Int. Cl.[7] .............................................. G09B 19/00
(52) U.S. Cl. ............................ 434/236; 434/309; 463/1
(58) Field of Search ................................. 434/308, 309, 434/318, 321, 236; 463/1, 30, 31, 35, 43

(56) References Cited

U.S. PATENT DOCUMENTS

| | | | | |
|---|---|---|---|---|
| 5,358,259 A | * | 10/1994 | Best | 273/434 |
| 6,287,196 B1 | * | 9/2001 | Kawano | 463/23 |
| 6,296,487 B1 | * | 10/2001 | Lotecka | 434/118 |

OTHER PUBLICATIONS

"Nightmare Creatures 2" Konami, May 1, 2000, retrieved from the Internet URL:<http://www.psxmanuals.com>.*

* cited by examiner

Primary Examiner—Michael O'Neill
Assistant Examiner—Julie Brocketti
(74) Attorney, Agent, or Firm—Seed IP Law Group PLLC

(57) ABSTRACT

A method of storytelling in an interactive system includes presenting a narrative, interrupting the presentation of the narrative in response to a user input, presenting information regarding at least one mental impression of a character in the narrative, and continuing the presentation of the narrative after presenting the information. The method can also include presenting the narrative, interrupting the narrative presentation to present a nonfictional analysis of the mental impression of at least one of the characters, and continuing the presentation of the narrative. A method of teaching in an interactive system can include presenting at least the first set of nonfictional psychological background information, and presenting a narrative in response to a user selection including a series of events demonstrating human actions and interactions consistent with the first set of nonfictional psychological background information. The interactive system can include separate communications channels for carrying the narrative and the mental impression related information.

41 Claims, 14 Drawing Sheets

METHOD, APPARATUS AND ARTICLE FOR PRESENTING A NARRATIVE, INCLUDING USER SELECTABLE LEVELS OF DETAIL

TECHNICAL FIELD

This invention is generally related to the presentation of narratives in audio, visual, and audio-visual forms.

BACKGROUND OF THE INVENTION

The art of storytelling is a form of communication dating back to ancient times. Storytelling allows humans to pass information on to one another for entertainment and instructional purposes. Oral storytelling has a particularly long history and involves the describing of a series of events using words and other sounds. More recently, storytellers have taken advantage of pictures and other visual presentations to relate the events comprising the story. Particularly effective is a combination of audio and visual representations, most commonly found in motion pictures and video.

Until recently, narrative presentations have typically been non-interactive, the series of events forming the story being presented in a predefined order, including a single level of predefined content. Interactive narrative presentation has only recently become available with the increasing availability of computers. These interactive presentations typically allow a user to control the direction that the story takes, effecting the order in which events are presented and often affecting the outcome of the story. For example, many video games and instructional computer programs for children present a series of events where user selections change the order of presentation of the events, and can cause the computer to present some events, while not presenting other events. Thus, a number of branching points exist in the narrative at which the user selection determines which of the events will be presented and the order of presentation. By varying selections, the user is presented with a different narrative each time.

Common forms of the narrative presentation, such as books, audio tapes, video tapes, motion pictures, and theatrical productions limit the user's ability to explore a particular character's motivations and subconscious mind. While some authors may provide a great deal of insight into a character's mental impressions, the level of insight that the user receives is necessarily limited by the narrative presentation. This often presents a problem for readers and listeners who wish to delve deeply in a character's motivations. This can also present an annoyance to listeners and readers who do not wish to delve as deeply as the author has intended, dissuading these listeners and readers from listening to and/or viewing the particular narrative.

SUMMARY OF THE INVENTION

Under one aspect of the invention, a method of storytelling in an interactive system includes presenting a narrative, interrupting the presentation of the narrative in response to a user input, presenting information regarding at least one mental impression of a character in the narrative, and continuing the presentation of the narrative after presenting the information. Thus, the user may interrupt the narrative to more deeply explore the mental impressions of one or more characters in the narrative, and then pick up the narrative from the point where the user left off.

In another aspect of the invention, the method of storytelling includes presenting the narrative, interrupting the narrative presentation to present nonfictional background information or analysis of the mental impressions of at least one of the characters, and then continuing the presentation of the narrative.

In a further aspect of the invention, a method of teaching in an interactive system includes presenting at least a first set of nonfictional psychological background information, and presenting a narrative in response to a user selection including a series of events demonstrating human actions and interactions consistent with the first set of nonfictional psychological background information.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments of the invention. However, one skilled in the art will understand that the invention may be practiced without these details. In other instances, well known structures associated with networks, web servers, web clients and web pages have not been shown or described in detail to avoid unnecessarily obscuring descriptions of the embodiments of the invention.

Unless the context requires otherwise, throughout the specification and claims, which follow, the word "comprise" and variations thereof, such as "comprises" and "comprising" are to be construed as "including all listed elements, but not excluding or limited to only the listed elements."

The headings provided herein are for convenience only and do not interpret the scope or meaning of the claimed invention.

Operating Environment

Figure 1:
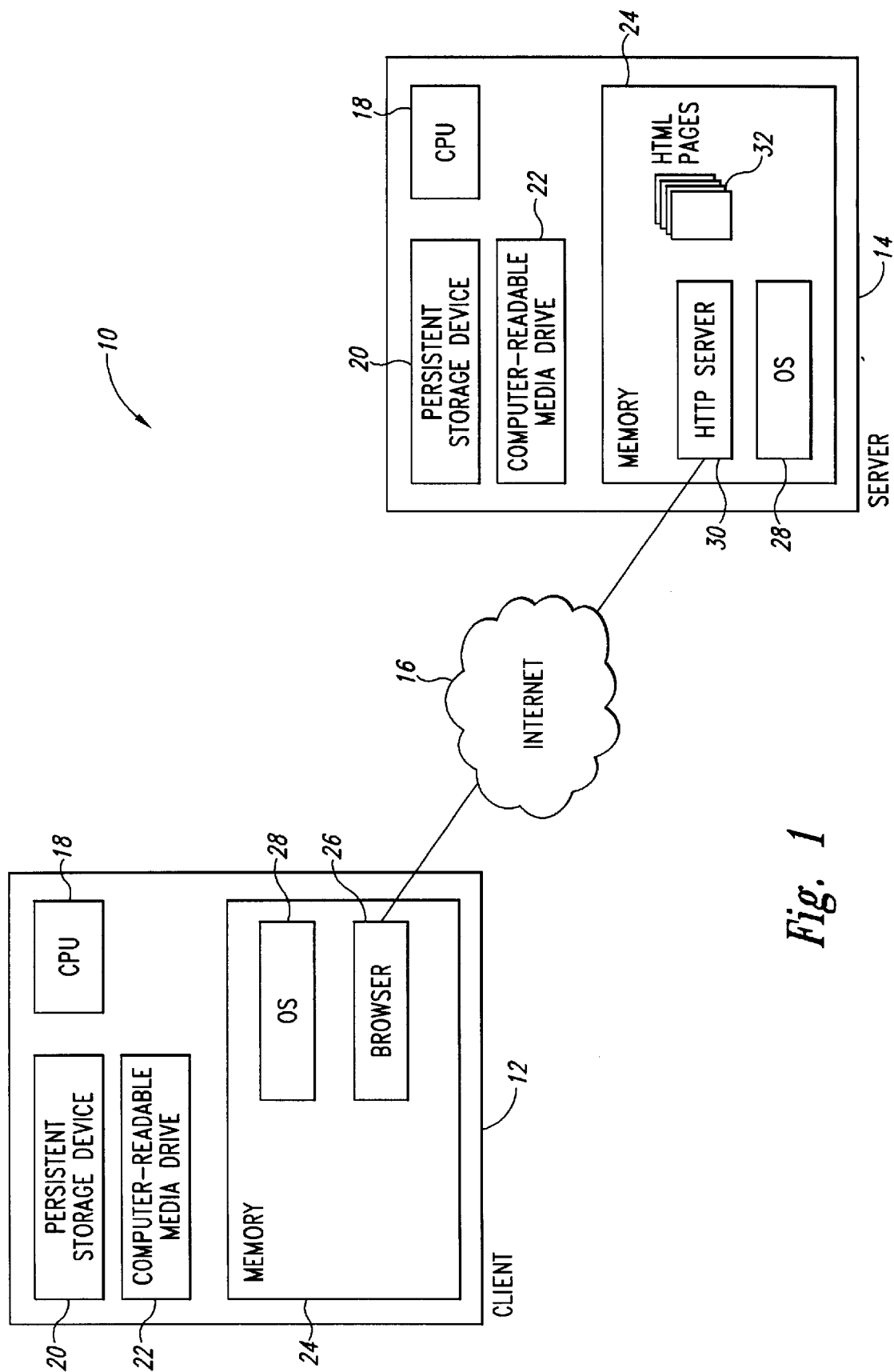
FIG. 1 is a high-level block diagram showing an environment in which the illustrated embodiment of the invention can operate.

FIG. 1 shows an environment 10 where a client computing device 12 ("client") communicates with a server computing device 14 ("server") over a network such as the Internet 16. While the exemplary environment 10 employs networking over the Internet 16, those skilled in the art will recognize that other environments are suitable. For example, networking the client 12 and server 14 over other networks such as local area networks ("LANs") or wide area networks ("WANs") can be suitable. Alternatively all of the functionality can be programmed into a single computing device to eliminate and/or reduce the need for networking. For example, an electronic book (i.e., "e-book") can include the appropriate functionality. New or additional narratives can be stored in the electronic book in a variety of ways such as via a CD-ROM, DVD, DVD ROM and/or networking.

The client 12 can take any of a variety of forms, including palm-top or hand-held computing appliances, laptop or desktop personal computers, workstation or s other computing devices. The client 12 includes a central processing unit ("CPU") 18, a persistent storage device 20, a computer-readable media drive 22 and a memory 24. The persistent storage device 20 can take the form of a hard drive or other memory device. The computer-readable media drive 22 can take the form of a floppy disk reader, a CD-ROM reader, an optical disk reader, or similar device that reads instructions from computer-readable media. The memory 24 can take the form of random access memory ("RAM") or other dynamic storage that temporarily stores instructions and data for execution by the CPU 18. For example, the memory 24 of the client 12 contains instructions for communicating across the World Wide Web portion of the Internet 16 using standard protocols (e.g., TCP/IP) in the form of a browser 26. Browsers are commercially available from a number of sources, such as NETSCAPE NAVIGATOR available from America Online and INTERNET EXPLORER from Microsoft Corporation of Redmond, Washington. The memory 24 of the client 12 also contains instructions in the form of an operating system ("OS") 28 for operating the client 12.

The server 14 includes a CPU 18, persistent storage device 20, computer-readable media drive 22 and memory 24 similar to the components of the client 12. The memory 24 of the server 14 includes instructions for responding to the browser 26, in the form of an HTTP server 30 for transferring HTML pages 32 the client 12 in response to a request from the browser 26. The memory 24 of the server 14 also includes instructions for controlling the operation of the server, in the form of an OS 28.

User Interface

Figure 2:
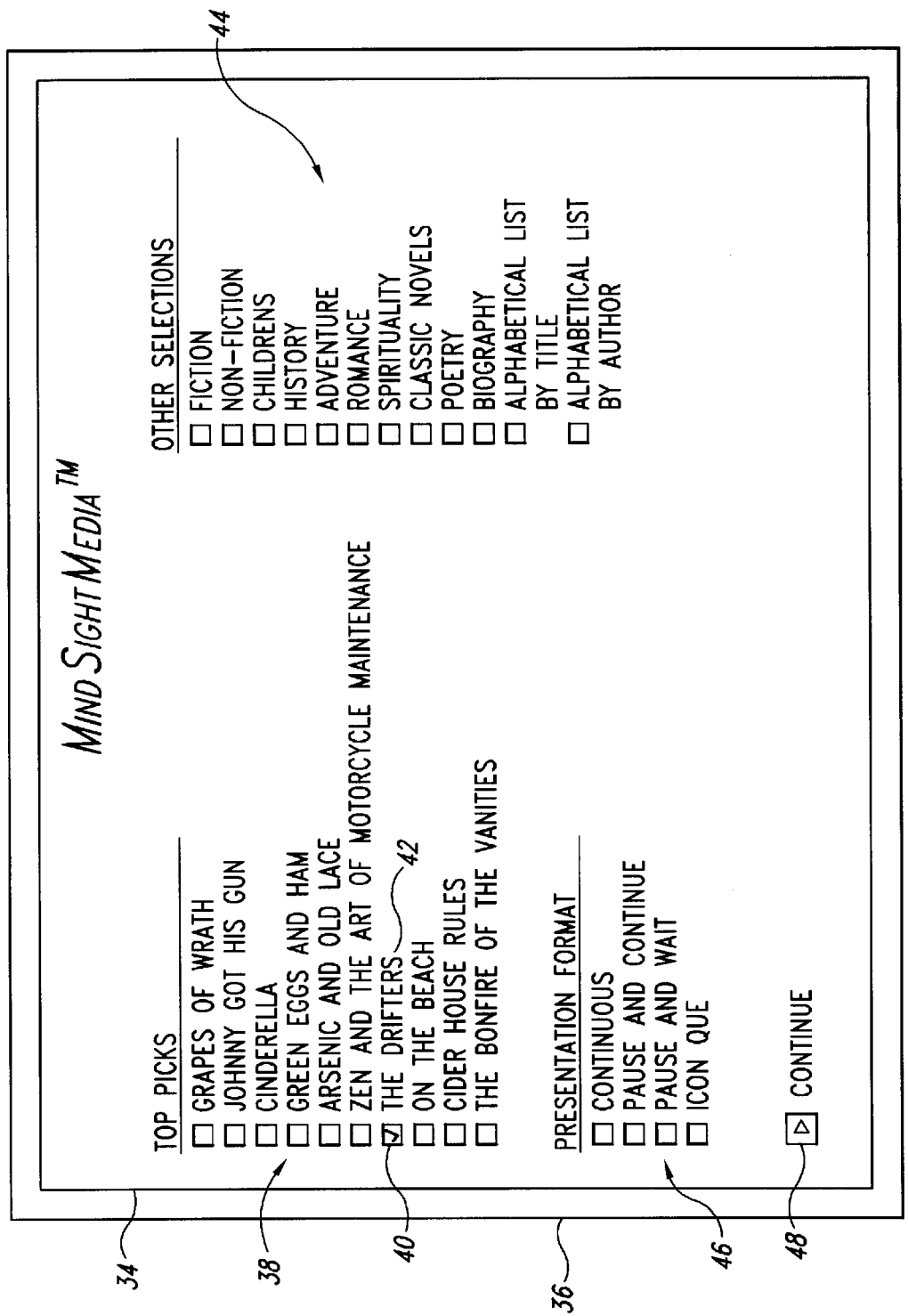
FIG. 2 is a display diagram showing a sample first narrative selection web page.

FIG. 2 shows a user interface for selecting a narrative in the form of a "narrative selection" web page 34 for being displayed on a display 36 associated with the client 12 (FIG. 1). The "narrative selection" web page 34 includes a number of user selectable "narrative selection" checkboxes 38 that the user can select using a mouse or other pointing device (not shown). Selection of one of the "narrative selection" checkboxes 40 identifies the narrative having the corresponding title 42 for presentation. A checkmark in the "narrative selection" checkbox 40 provides a visual indication that the corresponding narrative 42 has been selected. A second selection of previously selected "narrative selection" checkbox 40 causes the narrative 42 to become unselected. Thus, the "narrative selection" checkboxes 40 function as a toggle. The "narrative selection" web page 34 also contains a number of user selectable "category selection" checkboxes for accessing additional web pages of other narrative titles, for example by category.

The "narrative selection" web page 34 includes four user selectable "mode selection" checkboxes 46. Each of the "mode selection" checkboxes 46 is associated with a respective presentation operating mode. The presentation operating modes can include one or more of a continuous mode, a pause and continue mode, a pause and wait mode, and an icon cue mode. Selection of one of the presentation selection checkboxes 46 selects the corresponding presentation operating mode. Selection of a user selectable continue button 48 accepts the narrative and presentation operating mode selections, for example, by passing the selection information from the browser 26 of the client 12 to the HTTP server 30 of the server 14 (FIG. 1).

Figure 3:
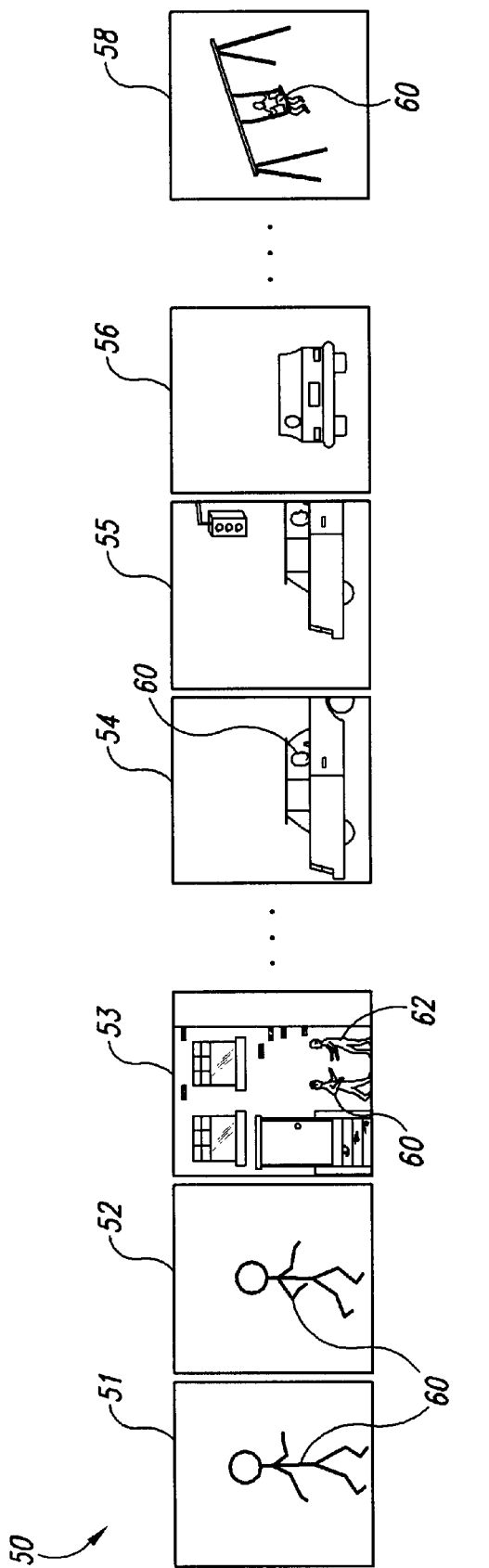
FIG. 3 is a display diagram showing a sample narrative in the form of a series of visual frames representing events.

FIG. 3 is a graphical representation of a narrative 50 in the form of a series of events 51–58. The events 51–58 revolve around a first character 60 and a second character 62. The narrative 50 is shown in a visual representation for ease of presentation and can include an audio presentation, or can consist of an audio presentation without any related visual presentation. The narrative 50 consists of the ordered series of events 51–58, typically presented in a first direction from a start 51 to a finish 58, although user selectable controls can allow the user to pause and/or stop the presentation, and/or change the direction of the presentation (e.g., forward and reverse). Thus, all of the narrative events 51–58 are presented unless interrupted by a user selection. The events 51–58 can include details about a character's life, activities, thoughts, interactions, and mental processes or impressions.

Examples of such narratives are found in motion pictures, television, video, books, and audio story presentations, to name a few. The series of events 51–58 typically present only one level of detail of a character's life, omitting many details and levels of details that the user may otherwise find of interest. The series of events 51–58 of FIG. 3 are of course only representative and most narratives 50 will include significantly more events and/or characters.

While not shown, a continuous presentation operating mode can sequentially present the events 51–58 of the narrative 50 without any interruption or presentation of additional mental impression information.

Figure 4:
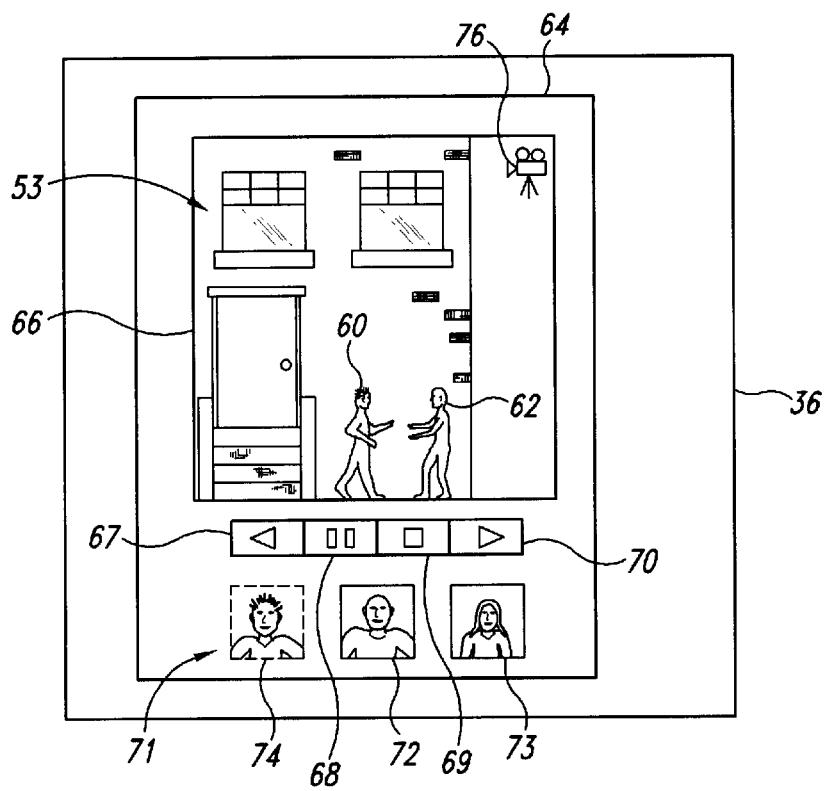
FIG. 4 is a display diagram showing a sample narrative presentation web page of an icon cue embodiment, and including user selectable character selection icons to select detailed mental impression information about the corresponding character.

FIG. 4 shows a user interface for presenting a narrative, in the form of a "narrative presentation" web page 64 on the display 36. The "narrative presentation" web page 64 of FIG. 4 demonstrates the icon cue presentation operating mode. Display of a "mental impression information availability" icon 76, can indicate the availability of mental impression information for one and/or more of the characters 60, 62. The "mental impression information availability" icon 76 can be displayed in the presentation window 66 to more readily attract the user's attention, thus cueing the user.

The "narrative presentation" web page 64 includes a presentation of the narrative events, such as the event 53. The narrative events 51–58 may be presented in a narrative presentation window 66. The "narrative presentation" web page 64 can include user selectable controls, such as a "reverse" button 67, a "pause" button 68, a "stop" button 69, and a "forward" button 70. Selection of the "reverse" button 67 or the "forward" button 70 selects a direction of the order of presentation of the events 51–58. Selection of the "pause" button 68 temporarily stops the presentation until either the "pause" button is reselected, or one of the "reverse" or "forward" buttons 67, 70 are selected. Selection of the "stop" button 69 stops the presentation of the narrative.

The "narrative presentation" web page 64 also includes user selectable "character selection" icons 72–74, representative of the characters in the narrative. The "character selection" icons 72–74 can include a pictorial representation of the characters and/or the character's name. Selection of one of the "character selection" icons 72–74 idenitifies the corresponding character for which the user wishes to receive mental impression information.

A visual feature of the "character selection" icon 72, 73, 74 can be modified to indicate the availability of mental impression information for the corresponding character 60, 62. For example, the "character selection" icons 72, 73 are highlighted when mental impression information is available for the respective characters 60, 62. A "character selection" icon 74 corresponding to a third character is not highlighted, indicating that no mental impression information is currently available for the third character.

Figure 5:
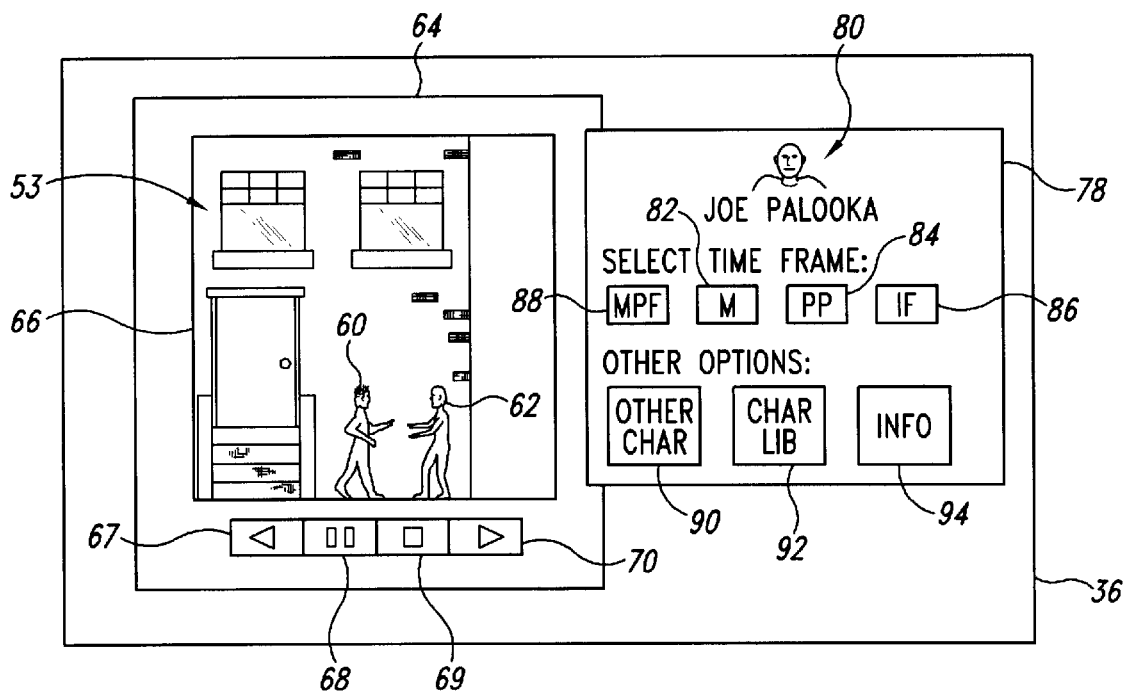
FIG. 5 is a display diagram showing the narrative presentation web page of FIG. 4, and a sample time frame selection web page including user to select a time frame for the mental impression information.

FIG. 5 shows the "narrative presentation" web page 64 along with a user interface for selecting a time frame in the form of a "time frame selection" web page 78. The CPU 18 (FIG. 1) displays the "time frame selection" web page 78 for a particular character 60, 62 in response to the identification of the character 60 by the user. The "time frame selection" web page 78 includes an identification 80 of the particular character, for example the character's name and/or a pictorial representation of the character. One or more user selectable "time frame" buttons 82–88 allow the user to select a reference point for the selected character's mental impressions with respect to a particular point in the narrative presentation 50 (FIG. 3). A "memory" button 82 allows the user to view information regarding mental impressions of the selected character 60 that the character formed at a point before the current point 53 in the narrative presentation 50. For example, selection of the "memory" button 82 can provide information regarding the mental impressions of the selected character 60 during the character's 60 childhood. Similarly, the "present prospective" button 84 provides information regarding the current or present mental impressions of the selected character 60. For example, the character's 60 thoughts about another character 62 at the current point 53 in the presentation of the narrative 50. An "imagined future" button 86 presents information regarding the selected character's 60 mental impressions of the imagined future. For example, the selected character 60 may have thoughts about what that character's life will be like some time in the future, prehaps imagining a new career or personal relationship. A "cumulative" button 88 can allow the user to receive information regarding past, present, and future mental impressions of the selected character 60.

The "time frame" selection web page 78 includes an "other character" button 90, allowing the user to view information regarding the mental impressions of other characters 60, 62. The "time frame" selection web page 78 also includes a "character library" button 92, the selection of which causes the presentation to the user of the information regarding the mental impressions of the selected character 60 for the entire narrative 50 (FIG. 3), and/or for additional narratives (not shown). An "information" button 94, provides a link to factual information regarding the motivations, interactions and mental impressions of the character 60, for example, non-fictional psychological background information and/or analysis.

Figure 6:
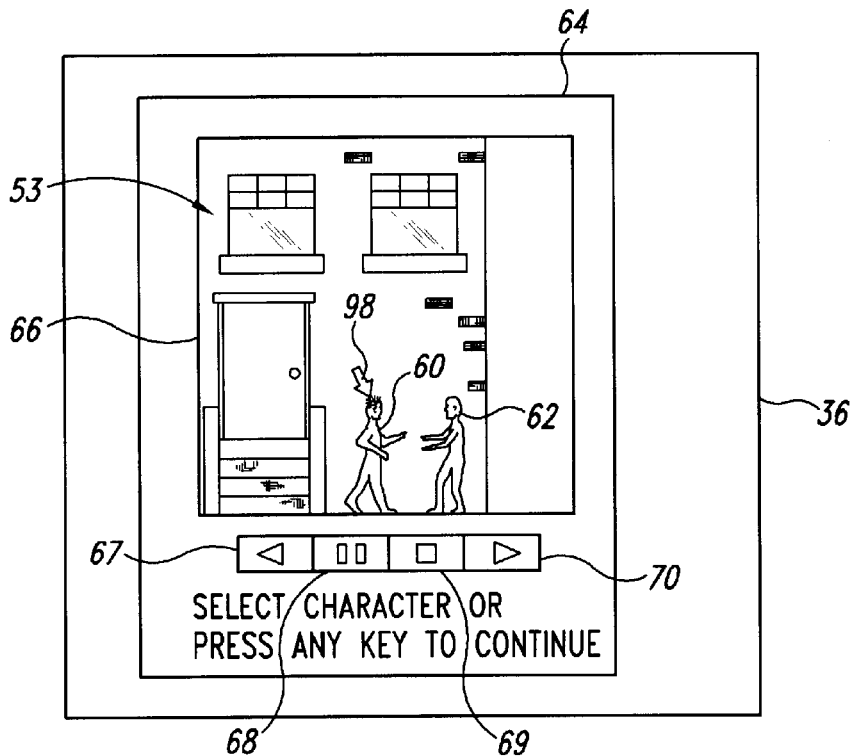
FIG. 6 is a display diagram showing a sample narrative presentation web page of a pause and wait embodiment, including user selectable characters in the narrative presentation.

FIG. 6 shows a "narrative presentation" web page 64 for operating in a pause and wait presentation operating mode, and allowing onscreen selection of characters. This alternative embodiment and other embodiments described herein are substantially similar to previously described embodiments, and common acts and structures are identified by the same reference numbers. The only significant differences in operation and structure are described below.

In the pause and wait presentation operating mode, the presentation pauses at preselected points of the narrative 50 (FIG. 3) to indicate to the user the availability of mental impression information, and to allow the user an opportunity to view such information. The user may choose to receive the mental impression information by selecting a key, if any, or by clicking a user input device such as a mouse or other pointing device (not shown). Alternatively, the user may select to continue with the presentation of the narrative without receiving any mental impression information by selecting the "forward" button 70 from the "narrative presentation" web page 64. In this mode, the narrative 50 remains in the paused state until a user input is received.

In the embodiment of FIG. 6, the user may select to review mental impression information regarding one of the characters 60, 62 using a mouse or other pointing device to identify the desired character 60 an with on-screen icon or pointer 98. Thus, the user may position the pointer 98 on, or proximate, one of the on-screen characters 60, 62 and select the desired character 60, for example, by clicking. Alternatively, or additionally, the pause and wait presentation operating mode can employ the user selectable icon 72 (FIG. 4) for choosing to review the mental impression information and for selecting a particular character 60, 62, 74 (FIG. 4).

Figure 7:
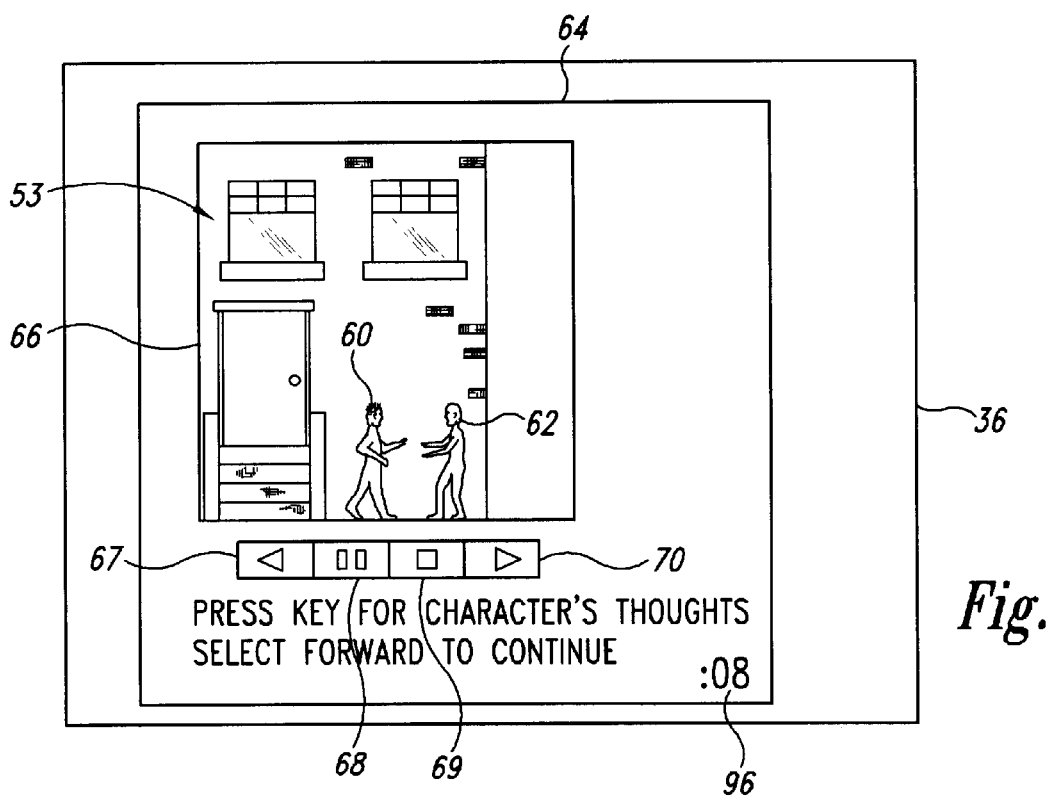
FIG. 7 is a display diagram showing a sample narrative presentation web page of a pause and continue embodiment, that relies on additional web pages to select the detailed mental impression information about the characters.

FIG. 7 shows the "narrative presentation" web page 66 operating in the pause and continue mode. In the pause and continue presentation operating mode, the narrative presentation pauses at predetermined points during the presentation, indicating that information regarding the mental impressions of one or more characters 60, 62 is available for review by the user. The presentation of the narrative 50 (FIG. 3) pauses for a set period of time, allowing the user to choose to view the mental impression information by way of a user input. An onscreen indicator, such as a count down clock 96, provides the user with the amount of time remaining to select to review the information before the presentation of the narrative 50 resumes. Selection of the "forward" button 70 by the user, causes the presentation to continue before the end of the set period of time.

Figure 8:
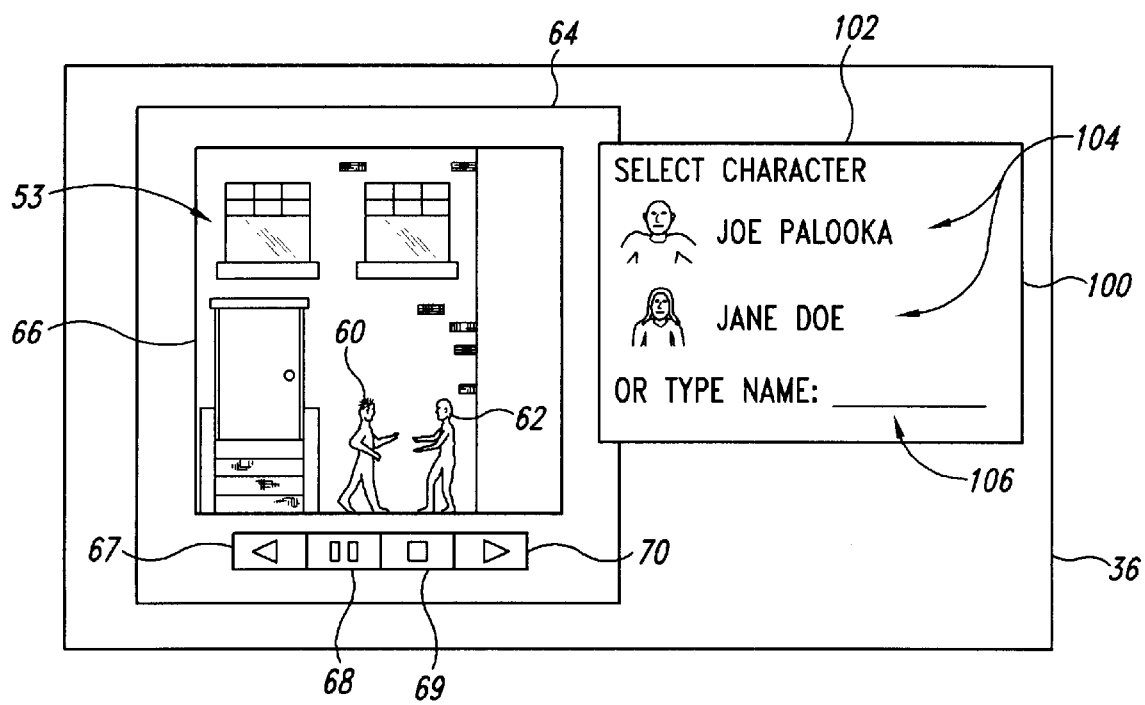
FIG. 8 is a display diagram showing the narrative presentation web page of FIG. 7 and a character selection web page.

FIG. 8 shows the "narrative presentation" web page 64 and a user interface for selecting a character in the form of a "character selection" web page 100. The CPU 18 (FIG. 1) displays the "character selection" web page 100 in response to the user's selection to receive character mental impression information. The "character selection" web page 100 includes a prompt 102 that indicates that the user should select a character 60, 62. The "character selection" web page 100 can include a user-selectable representation of the characters 60, 62 for which mental impression information is available, for example, the picture of the character and/or the character's name 104. The "character selection" web page 100 can also include a field 106 for receiving an identifier that identifies the character, such as the character's name. Selection of the graphical representation 104 or entry of a name in the field 106 retrieves the "time frame" selection web page 78 (FIG. 5). The "character selection" web page 100 can also be used with the icon cue (FIG. 4) or the pause and wait (FIG. 6) presentation operating modes.

In an alternative embodiment, the functions of the "character selection" web page 100 and the "time frame" selection web page 78 can be combined, as a single user interface such as a "mental impression information" selection web page (not shown). The "mental impression information" selection web page can group one or more user selectable character representations (i.e., character selection icons) 104 (FIG. 8) corresponding to each of the available characters 60, 62 under each of the available time frames. Alternatively, the "mental impression information" selection web page can group one or more "time frame" buttons 82–88 (FIG. 5) corresponding to each of the available time frames under each of the available characters 60, 62. Thus, the user only needs to interact with a single user interface.

Figure 9:
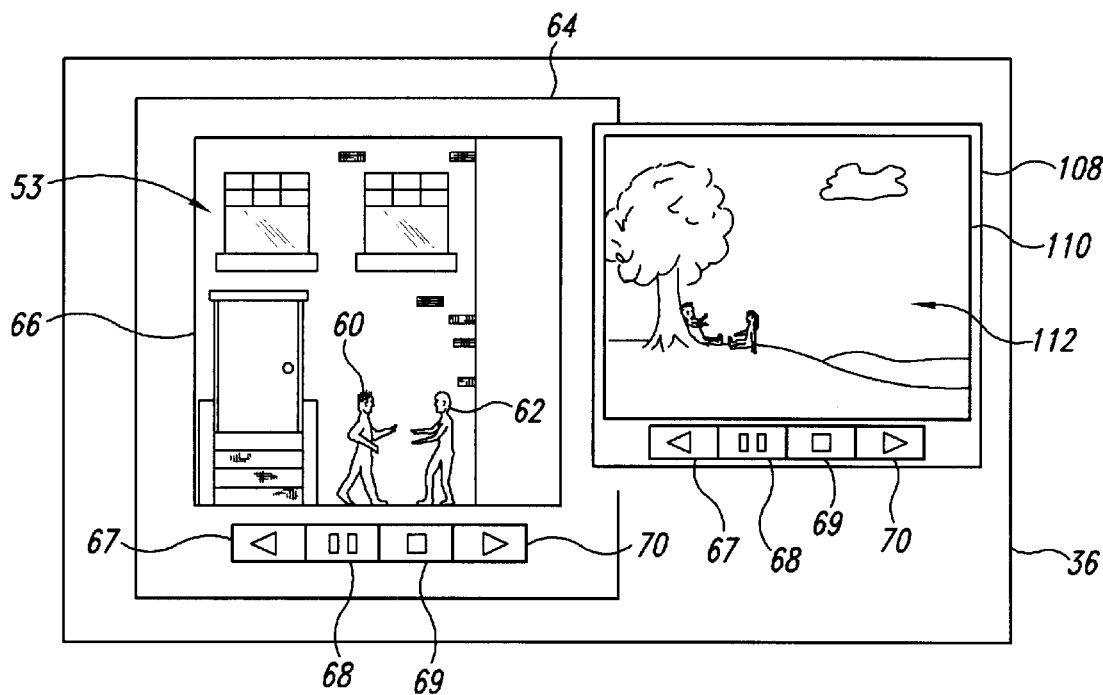
FIG. 9 is a display diagram showing the sample narrative presentation web page and a sample mental impression information presentation web page.

FIG. 9 shows a "mental impression information" web page 108 that includes a mental impression information window 110 for presenting the mental impression information 112 of the selected character 60 for a selected time frame with respect to the current point 53 in the presentation of the narrative 50. The mental impression information 112 can include visual, audio, or audio/visual representation of the selected character's mental impressions for the selected period. For example, the mental impression information 112 for a first character 60 meeting a second character 62 at a current point 53 (FIG. 4) in the narrative 50 (FIG. 3) can include a remembrance of a past meeting between the first character 60 and the second character 62 (as represented in FIG. 9). Thus, the mental impression information can include events, acts, thoughts, feelings, moods, interactions and other narrative elements. Current or present mental impressions, and mental impressions about the imagined future can also be presented.

The "mental impression information" web page 108 can include a set of user controls 67–70. The "narrative presentation" web page 64 and the "mental impression information" web page 108 are shown slightly overlapping for ease of presentation, although the "mental impression information" web page 108 may completely overlap, or replace the narrative presentation web page 64, for example, completely filling the display 36. Other common windowing techniques may be employed with this, and other web pages and user interfaces.

Figure 10:
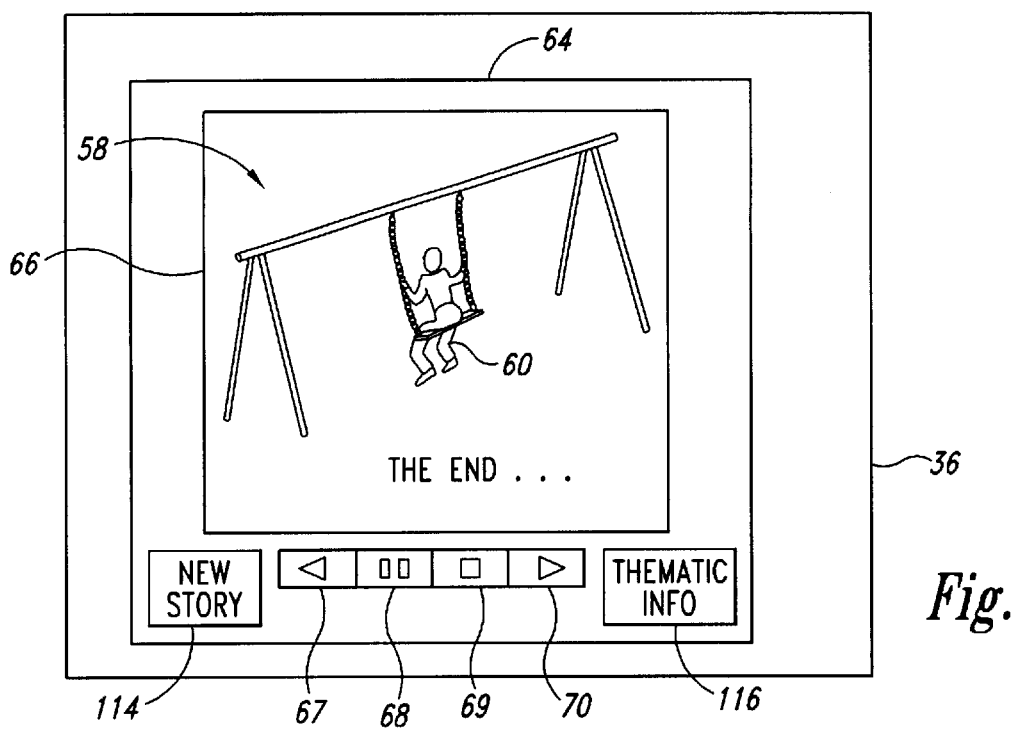
FIG. 10 is a display diagram showing a sample of the narrative presentation web page for a final event of the narrative, and including additional user selectable links.

FIG. 10 shows the presentation of the final event 58 of the narrative 50. The "narrative presentation" web page 64 includes additional user-selectable control buttons when displaying the final event 58. A "new story" button 114 allows a user to select a new story or narrative for presentation. A "thematic information" button 116 links the user to a set of non-fictional information about the themes presented in the narrative 50, for example, psychological background or analysis information. The "new story" button 114 and the "thematic information" button 116 can be included in the "narrative presentation" web page 64 during other portions of the narrative presentation.

Figure 11:
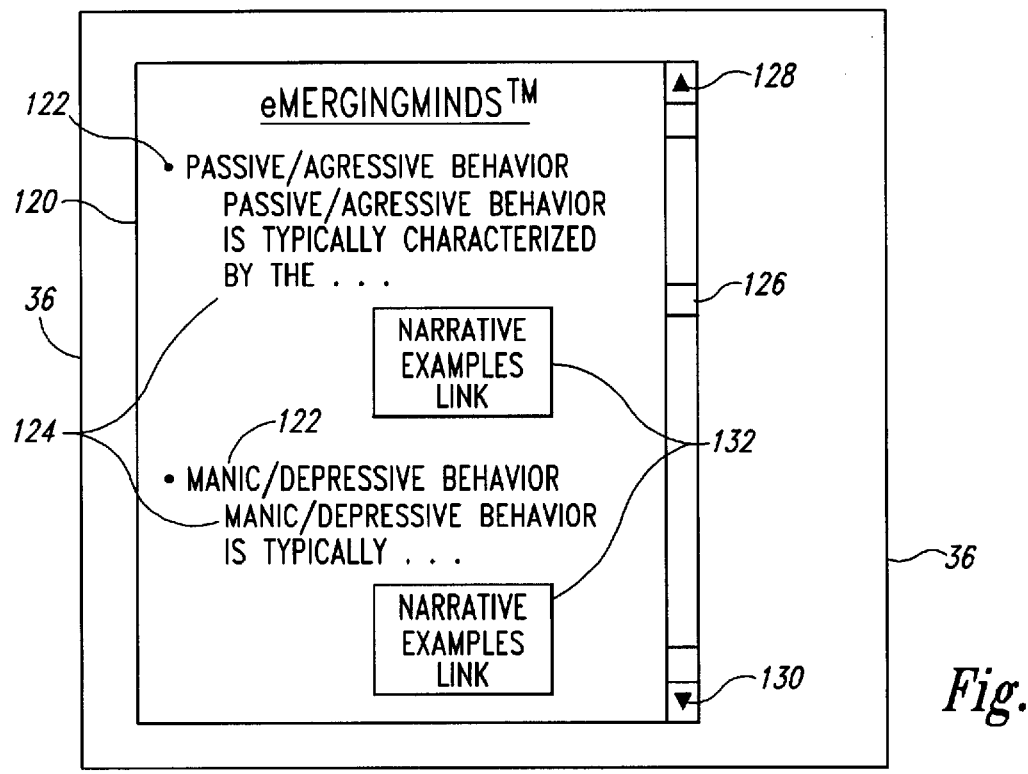
FIG. 11 is a display diagram showing a sample factually based psychological information web page.

FIG. 11 shows a user interface for presenting nonfictional psychological background and analysis information in the form of a "psychological background information" web page 120. The "psychological background information" web page 120 contains nonfictional, psychological background and analysis information regarding a large variety of human behaviors. For example, information regarding the basic motivations of human behavior are presented. The presentation can include titles or section headings 122 and descriptive passages 124 describing the various aspects of human behavior. A user selectable scroll bar 126 allows the user to scroll through the various topics. Upward and downward scrolling icons 128 and 130, respectively, scroll the psychological background information up and/or down. The "psychological background information" web page 120 can include "example" links to narrative examples representing the described behaviors.

Operation

Figure 12:
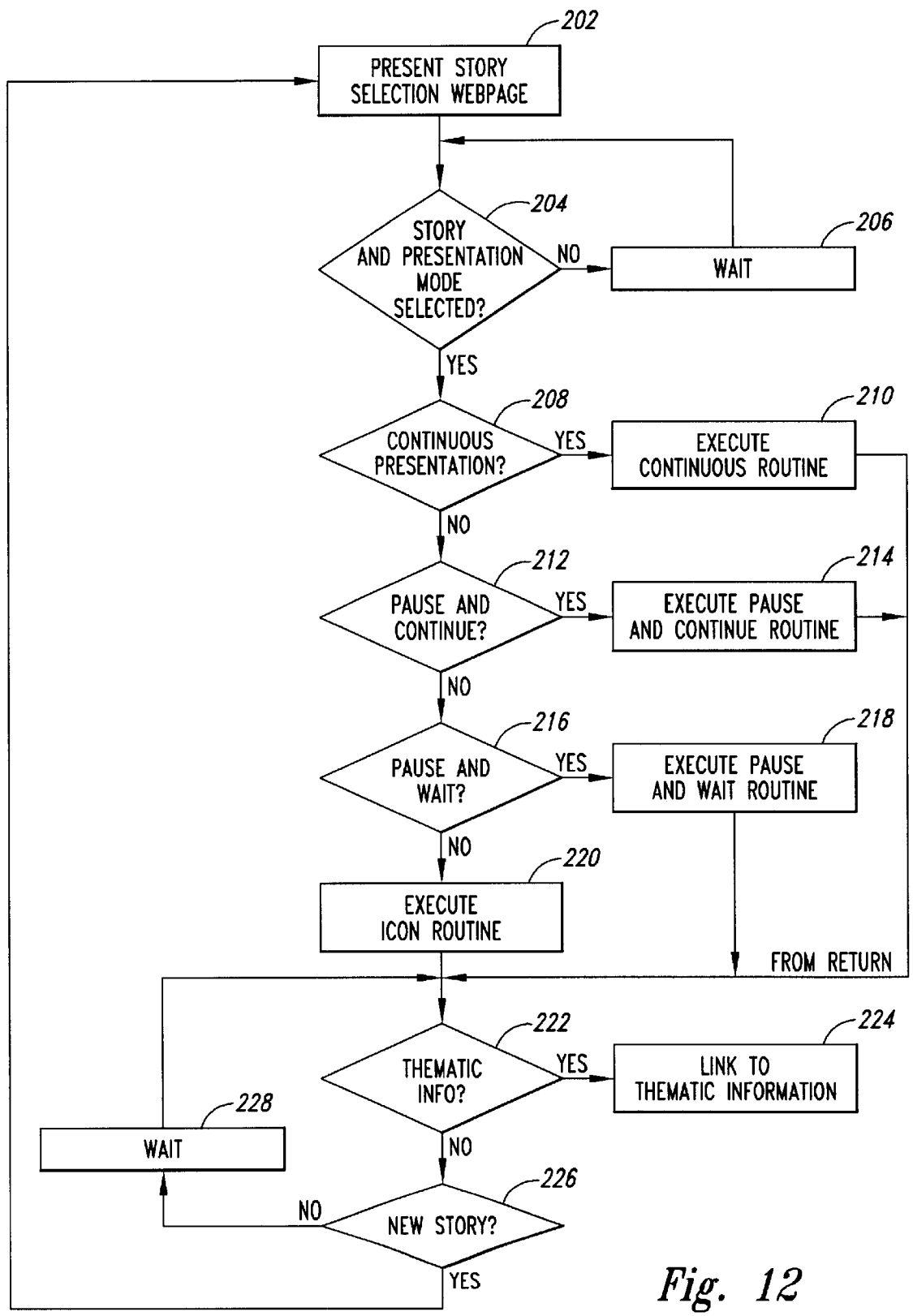
FIG. 12 a high-level flow diagram showing a method of presenting and controlling the presentation of narrative and mental impression information, including four modes of operation.

FIG. 12 shows an overall presentation method 200 of operating in the environment 10 (FIG. 1) to present the narrative 50 (FIG. 3) using the "narrative selection" web page of FIG. 2. The presentation method 200 will be discussed with reference to the CPU 18 of the server 14 (FIG. 1), however, one skilled in the art will recognize that the operation can be performed by another computing device. For example, the CPU 18 of the client 12, or some third computing device (not shown) can perform the presentation method 200. A single computing device, for example, an electronic book can perform the presentation with, or without, networking. For example, a computing device having a CD-ROM or optical disk can employ its own graphical user interface instead of th exemplary web pages. The system may also employ networking options other than traditional computer networking, for example, a cable television network ("CATV").

In step 202, the CPU 18 of the server 14 (FIG. 1) presents the narrative selection user interface, in the form of the "narrative selection" web page 34 (FIG. 2). The "narrative selection" web page 34 allows the user to select a story and a desired presentation operating mode. In step 204, the CPU 18 of the server 19 determines whether the story and the presentation operating mode have been selected, entering a wait loop in step 206 until the user has made such selections. In step 208, the CPU 18 determines whether the user has selected a continuous presentation operating mode and executes a continuous operation routine in step 210 if the user has selected such a mode. In step 212, the CPU 18 determines whether the user has selected a pause and continue presentation operating mode and executes a pause and continue routine in step 214 in response to such a selection. In step 217, the CPU 18 determines whether the user has selected a pause and wait presentation operating mode and executes a pause and wait routine in step 218 in response to such a selection. The CPU 18 executes an icon cue presentation mode routine in step 220 as the default presentation operating mode if the user has not selected one of the other presentation operating modes.

After execution of the appropriate presentation operating mode, discussed below, the CPU 18 passes control to step 222, where the CPU 18 determines whether the user has selected to view nonfictional psychological background information about the themes presented in the narrative 50. If the user has selected to view the background information, the CPU 18 links to a database of nonfictional psychological background information such as a psychological background web site in step 224. If the user has not selected to view the nonfictional psychological background information, the CPU 18 in step 226 determines if the user has selected the "new story" button 114 (FIG. 10), to select a new narrative for presentation. The CPU 18 passes control back to step 202 if the user has selected the "new story" button 114. The CPU 18 executes a wait loop in step 228 until user selections are received.

Figure 13:
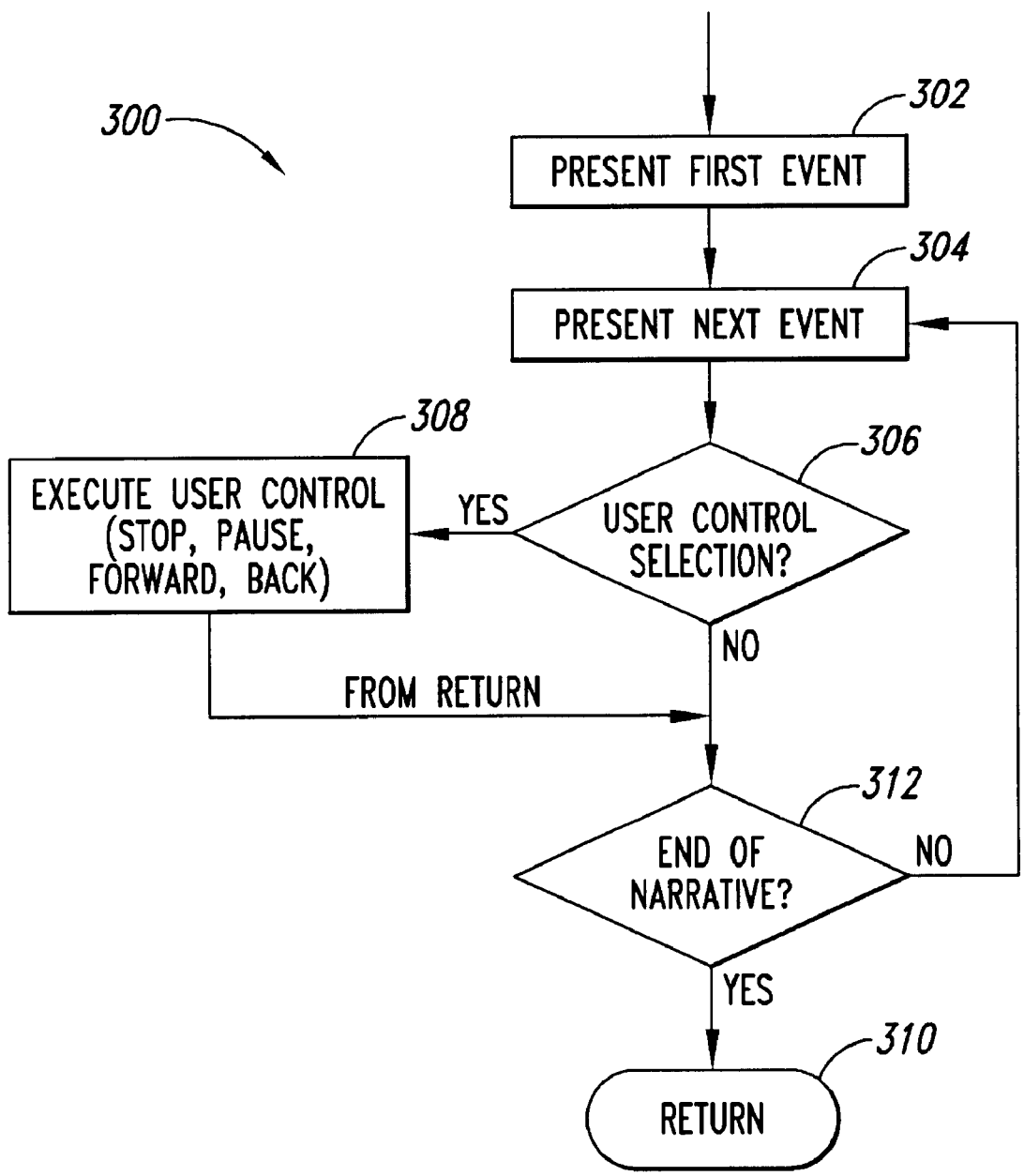
FIG. 13 is a flow diagram showing a method of presenting and controlling a narrative presentation in a continuous mode.

FIG. 13 shows the continuous presentation operating mode 300 for continuously presenting the narrative 50 (FIG. 3) without psychological background information or interruption. In step 302, the CPU 18 of the server 14 presents the first vent 51 by downloading the appropriate visual and/or audio data to the client 12 for display or presentation. In step 304, the CPU 18 of the server 14 presents the next event 52 of the narrative 50, by downloading the appropriate visual and/or audio data. In step 306, the CPU 18 determines whether the user has selected one of the user controls 67–70. The CPU 18 passes control to step 308 in response to a selection of one of the user controls 67–70 for execution of a user control routine. The details of stopping, pausing, forwarding and reversing video and/or audio on computer systems are known to those skilled in the art, so are not explained here in the interest of brevity. In step 312, the CPU 18 determines whether the last event 58 of the narrative 50 has been reached, passing control back to step 304 if the end of the narrative 50 has not been reached. The CPU 18 terminates the continuous presentation operating mode 300 if the last event 50 is reached by returning to the calling routine 200 in step 310.

Figure 14:
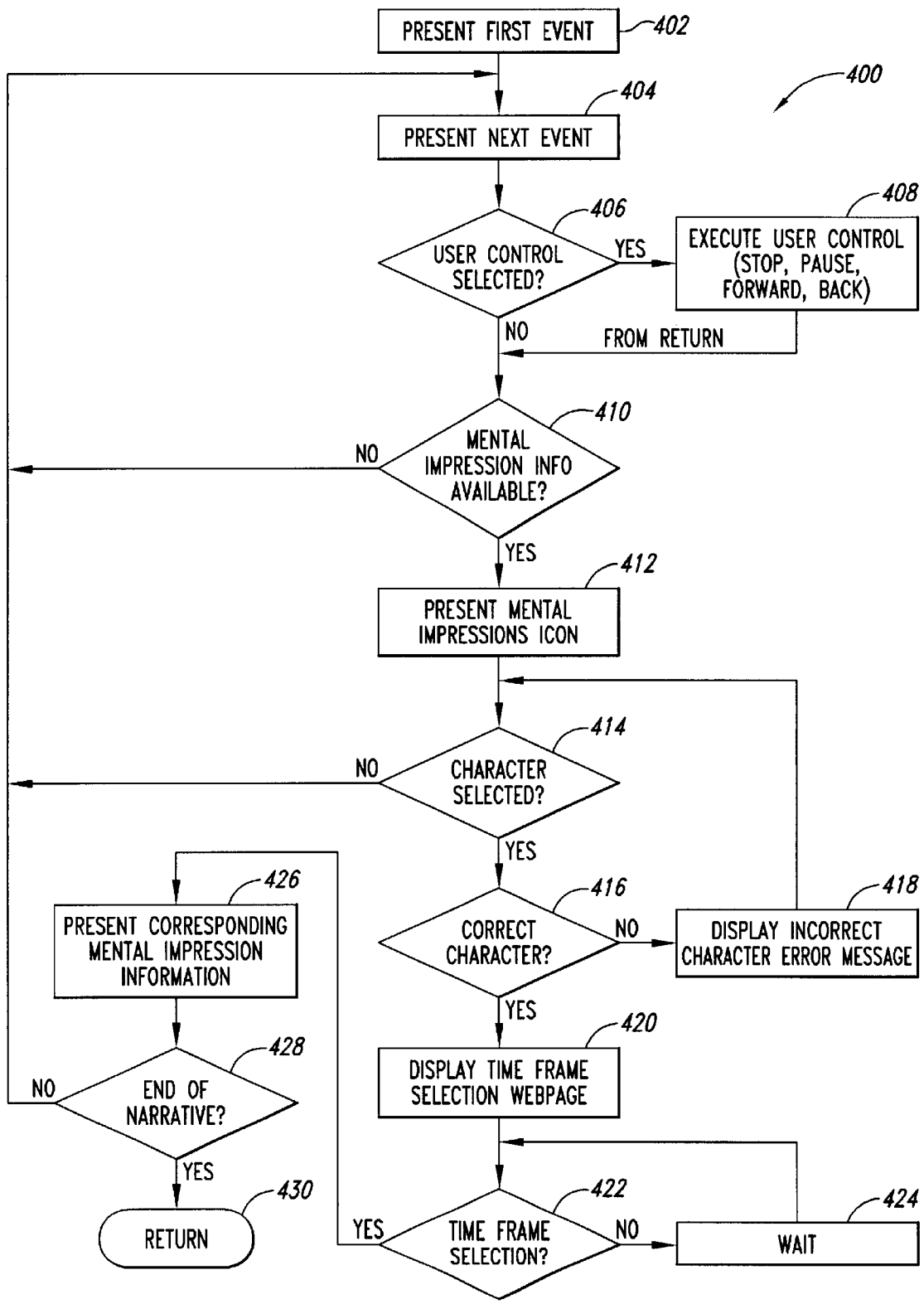
FIG. 14 is a flow diagram showing a method of displaying and controlling narrative and mental impression information in an icon cue mode.

FIG. 14 shows an icon cue presentation operating mode 400 that provides an indication to the user when mental impression information is available, such as by highlighting character selection icons 60, 62, or displaying the "mental impression information availability" icon 76 (FIG. 4). The icon cue presentation operating mode 400 is particularly suited for use with the "narrative presentation" web page 64 of FIG. 4 and the "time frame selection" web page 78 of FIG. 5.

In step 402, the CPU 18 presents the first event 51 of the narrative 50. The CPU 18 of the server 14, can download an appropriate web page, or the appropriate visual and/or audio data corresponding to the first event 51 to the client 12. The CPU 18 of the client 12 can display the information downloaded by the CPU 18 of the server 14. Alternatively, the CPU 18 of the client 12 may retrieve the appropriate visual and/or audio information from a memory device associated with the client 12, such as a DVD, DVD-ROM or CD-ROM.

In step 404, the CPU 18 presents the next event 52 of the narrative 50, employing similar methods to those described immediately above. In step 406, the CPU 18 determines whether the user has selected one of the user controls 67–70 (FIG. 4) for controlling the presentation of the narrative 50. If the user has selected one of the user controls 67–70, the CPU 18 passes control to step 408, executing a user control routine to service the selection. After servicing the selection, the CPU 18 passes control to step 410.

If the user has not selected one of the user controls 67–70, the CPU 18 determines whether mental impression information is available in step 410. The CPU 18 may check a look-up table or similar data structure (not shown) to determine whether mental impression information is available for the particular event 51–58 currently being displayed. In one embodiment, the CPU 18 checks for mental impression information for all characters 60, 62 in the narrative, while in an alternative embodiment the CPU 18 only checks for mental impression information for characters involved in the current event 53. This alternative embodiment is particularly useful where the user selects the character 60, 62 by manipulating the on-screen cursor 98 (FIG. 6). If no mental impression information is available, the CPU 18 returns control to step 404 to present the next event in the narrative 50. If mental impression information is available, control passes to step 412, as discussed below.

In step 412, the CPU 18 presents an indication of the availability of mental impression information such as by displaying the "mental impression information availability" icon 76 (FIG. 4), or highlighting one of the "character selection" icons 72–74 (FIG. 4), or by displaying the character selection web page 78 (FIG. 5). In step 414, the CPU 18 determines whether the user has selected a character. If a character has not been selected in step 414, the CPU 18 returns control to step 404 to present the next event in the narrative 50. If a character has been selected in step 414, the CPU 18 determines whether a correct character selection has been made in step 416, for example by determining whether mental impression information is available for the selected character. If the correct character has not been selected, the CPU 18 passes control to step 418, to display an incorrect character selection error message, returning control to step 414 to determine whether another character selection has been made.

If a correct selection has been made in step 416, the CPU 18 displays a time frame selection user interface in the form of the "time frame" selection web page 78 (FIG. 5) in step 420. As discussed above, the "time frame" selection web page 78 permits the user to select a desired time frame for the mental impression information of the character, with respect to the current point 53 in the narrative 50. Thus, the user is presented with choices of past, present and future with respect to the current point 53 in the narrative 50.

In step 422, the CPU 18 determines whether a time frame selection has been made, performing a wait loop 424 until the selection is received. Once a time frame selection is made, the CPU 18 presents the corresponding mental impression information in step 426. While not shown, each of the wait loops may include a timing function causing the control to pass to step 404 after a predetermined period of time is exceeded without a corresponding user selection.

In step 428, the CPU 18 determines whether the final event 58 of the narrative 50 has been reached, passing control to step 404 if the end of the narrative 50 has not been reached. The CPU 18 terminates the pause and wait presentation operating method 400 by returning to the calling routine in step 430 if the end 58 of the narrative has been reached.

Figure 15:
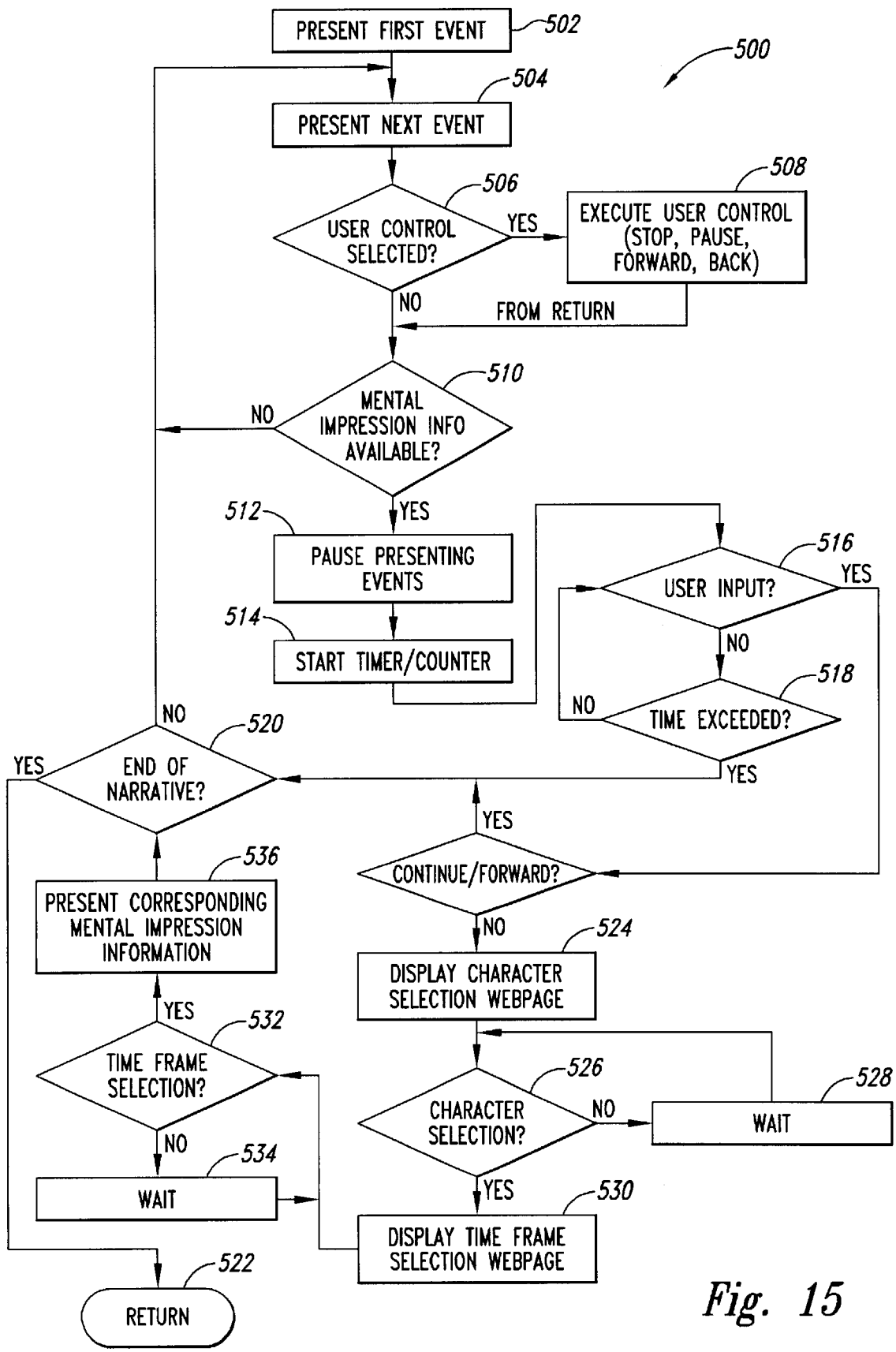
FIG. 15 is a flow diagram showing a method of presenting and controlling narrative and mental impression information in a pause and continue mode.

FIG. 15 shows a pause and continue presentation operating mode 500 that pauses for a predetermined time when mental impression information becomes available, allowing the user to select to view the available mental impression information. The pause and continue presentation operating mode 500 is particularly suited to the "narrative presentation" web page 64 of FIG. 6 and the "time frame selection" web page 78 of FIG. 5.

In step 502, the CPU 18 of the server 14 causes the client 12 to present the first event 51 in the narrative 50, as discussed above. In step 504, the CPU 18 presents the next event 52 in the narrative 50. In step 506, the CPU 18 determines whether the user has selected one of the user controls 67–70, executing a user control routine 508 if such a selection has been made. If a user control selection has not been made, the CPU 18 determines whether mental impression information is available in step 510. If no mental impression information is available, the CPU 18 returns control to step 504.

If mental impression information is available, the CPU 18 pauses the presentation of the events 51–58 of the narrative 50 in step 512. In step 514, the CPU 18 starts a timer or counter. In step 516, the CPU 18 determines whether any user input has been received. If no user input has been received, the CPU 18 determines whether the predetermined time for receiving user input has been exceeded in step 518. If the time has not been exceeded, control returns to step 516. If the time has been exceeded in step 518, control passes to step 520, where the CPU 18 determines whether the final event 58 of the narrative 50 has been reached. If the end 58 of the narrative 50 has not been reached, the CPU 18 passes control back to step 504 to present the next event. If the end 58 of the narrative 50 has been reached, the CPU 18 terminates the pause and continue the routine 500, returning control to the calling routine in step 522.

If user input has been received in step 516, the CPU 18 displays the "character selection" web page 78 (FIG. 5) in step 524. In step 526, the CPU 18 determines whether the user has selected a character from the "character selection" web page 74. If no character selection has been made, the CPU 18 performs a wait loop 528, waiting for a character selection. The wait loop 528, may include an automatic exit after a predetermined number of cycles or time has been exceeded.

After a character selection has been made, the CPU 18 displays the "time frame selection" web page 78 in step 513. The "time frame selection" web page allows the user to select a time frame for the mental impression information with respect to the current point 53 in the narrative 50. In step 532, the CPU 18 determines whether the user has made a time frame selection, executing a wait loop in 534 until such a selection has been made, or until some predetermined number of cycles or time has been exceeded. The CPU 18 presents the corresponding mental impression information in step 536, in response to a time frame selection, and passes control to step 520 to determine whether the end 58 of the narrative 50 has been reached.

Figure 16:
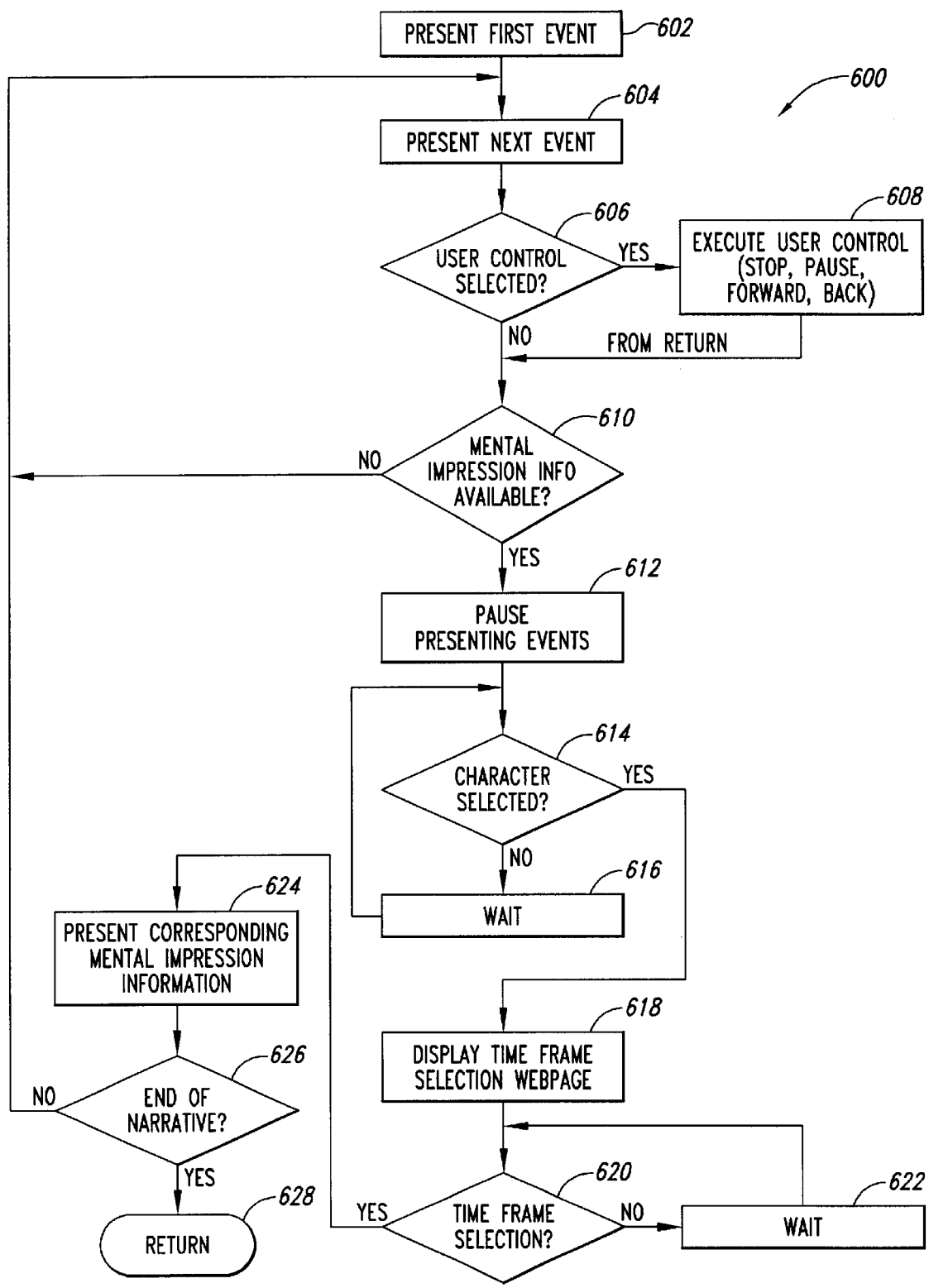
FIG. 16 is a flow diagram showing a method of displaying and controlling narrative and mental impression information in a pause and wait mode.

FIG. 16 shows a pause and wait presentation operating mode 600 that pauses the presentation of the narrative 50 for an indefinite period each time mental impression information is available. The pause and wait presentation operating mode 600 is particularly suited for use with the "narrative presentation" web page 64 of FIG. 7, the "character selection" web page 100 of FIG. 8, and the "time frame selection" web page 78 of FIG. 5.

In step 602, the CPU 18 of the server 14 presents the first event as generally described above. In step 604, the CPU 18 presents the next event 52 of the narrative 50. In step 606, the CPU 18 determines whether the user has selected one of the user controls 67–70, executing a user control routine 608 in response to such a selection. In step 610, the CPU 18 determines whether mental impression information is available. If mental impression information is not available, the CPU 18 returns control to step 604 to present the next event 51–58 in the narrative 50. If mental impression information is available, the CPU 18 pauses presenting events in step 612. In step 614, the CPU 18 determines whether a character has been selected. Selection may be by use of a mouse or other pointing device to manipulate an on-screen icon (FIG. 6) to identify one of the characters 60, 62.

If a character has not been selected, the CPU 18 executes a wait loop 616. The CPU 18 can execute the wait loop indefinitely. The CPU 18 displays the "time frame selection" web page 78 (FIG. 5) in step 618 in response to the selection of the character. The time frame selection web page 78 corresponds to the particular character 60, 62 selected.

In step 620, the CPU 18 determines whether the user has made a time frame selection. The CPU 18 executes a wait loop in step 622, until a time frame selection is made or until some predetermined number of cycles or time is exceeded. In step 624, the CPU 18 presents corresponding mental impression information in response to the time frame selection. In step 626, the CPU 18 determines whether the end 58 of the narrative 50 has been reached. The CPU 18 returns control to step 604 if the end 58 has not been reached. The CPU 18 terminates the pause and wait routine 600 by returning control to the calling routine in step 628, if the end of the narrative 50 has been reached.

Figure 17:
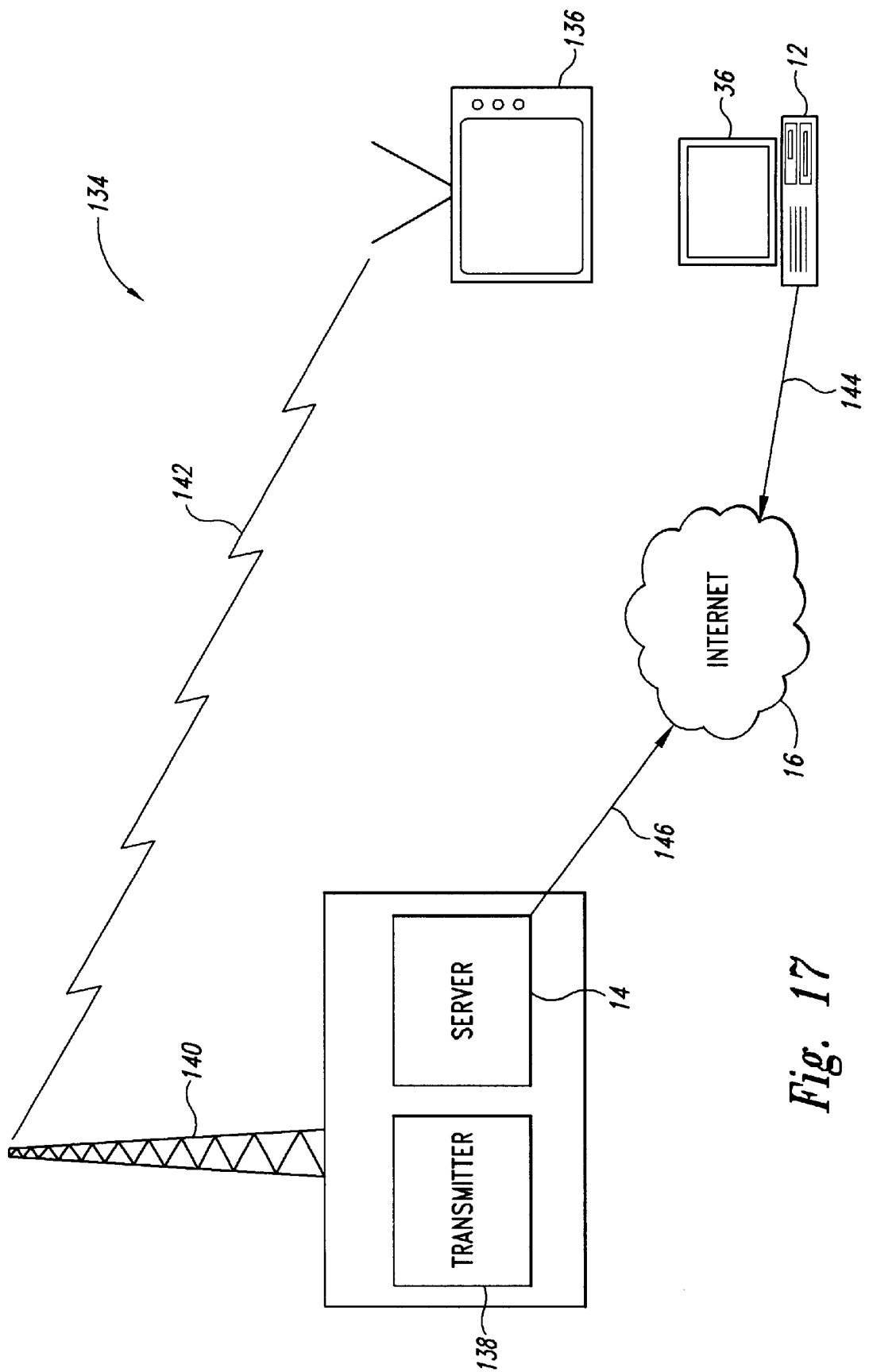
FIG. 17 is a high-level block diagram showing an alternative environment in which the invention can operate.

FIG. 17 shows an alternative environment 134 for practicing an embodiment of the invention. The environment 134 includes a first user communication device such as a television 136 and a second user communication device such as the client 12 and display 36. The environment 134 also includes a transmitter 138 and the server 14. The transmitter 138 transmits the narrative 50 (FIG. 3) for receipt by the user. For example, the transmitter 138 can employ an antenna 140 to wirelessly transmit the narrative in the form of a television and/or radio signal 142. Alternatively, the transmitter can employ a wired network, such as a LAN, WAN, CATV or other network, to transmit the narrative as a networked signal. The users television 136 recives the transmitted signal 142 for presenting the narrative to the user. The server 14 communicates with the client 12 to provide access to the mental impression information. The server 14 and client 12 communicate using some other wired or wireless communications channel, such as the Internet 16 or World Wide Web portion of the Internet 16. The.communications.channel between the server 14 and client 12 should be bi-directional, while the communications channel between the the transmitter 138 and the television 136 can be uni-directional. In particular, the communications channel carrying the narrative 50 generally requires a broader bandwidth than the communications channel carrying the mental impression related information.

Figure 18:
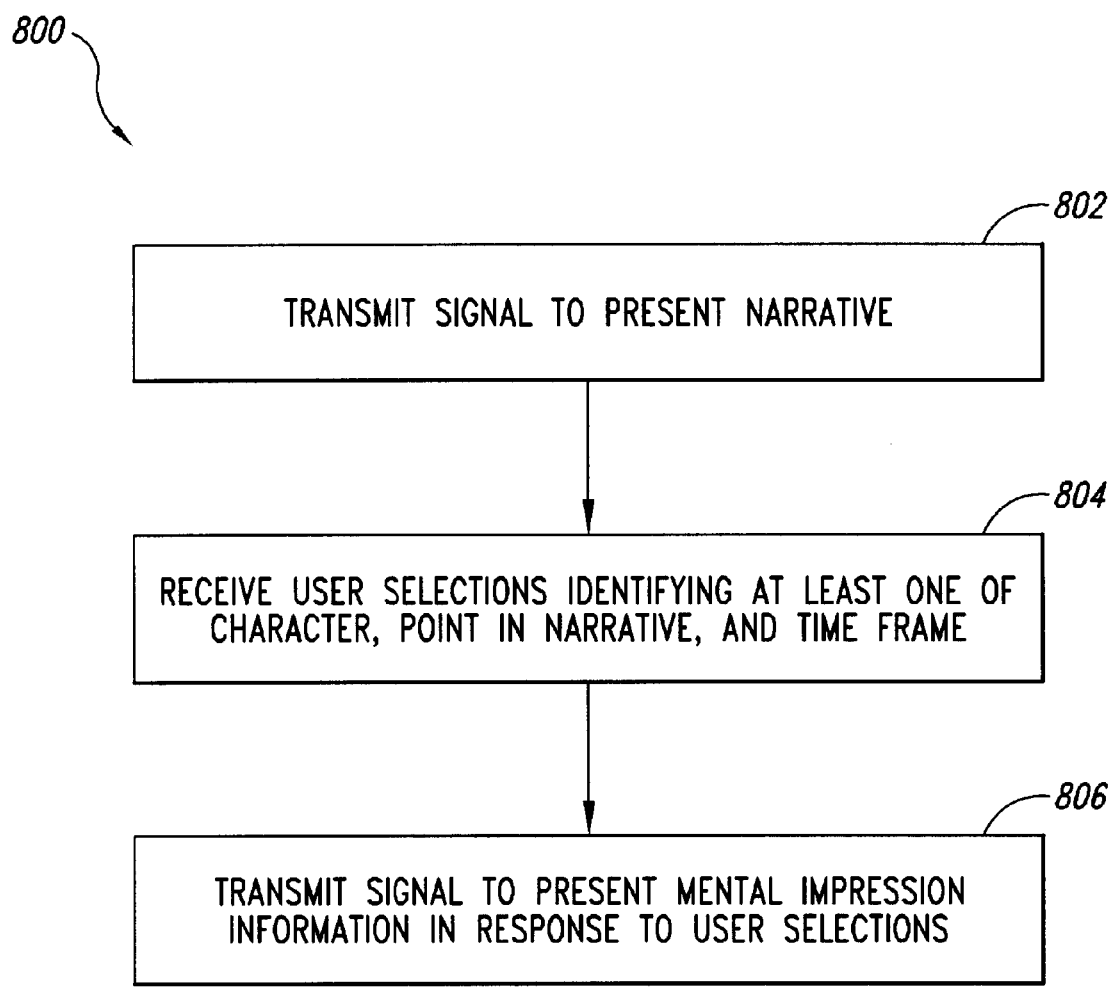
FIG. 18 is a high-level flow diagram showing an alternative method of presenting a narrative and mental impression information.

FIG. 18 shows a method 800 of presenting a story in the environment 134 (FIG. 17). In step 802, the transmitter 138 transmits the signal 142 to the user, for example, via the television 136. The user may view a portion or all of the narrative 50 before identifying one or more characters 60, 62 for which the user wishes to receive mental impression information. For example, after reviewing the entire narrative 50, the user can use the client 12 to access a web site on the server 14 to select and receive the pertinent mental impression information. The narrative can provide the user with the appropriate uniform resource locator ("URL") for accessing the web site on the server 14.

In step 804, the server 14 receives a signal 144 representing user selections identifying at least one of a character, a point in the narrative and a time frame. In response, the server 14 in step 806 transmits a signal 146 carrying the selected mental impression information to the user. The mental impression information can, for example, be displayed on the display 36 associated with the client 12. The embodiment of FIGS. 17 and 18 permit the narrative 50 to contain relatively complicated audio/visual information which can be carried over traditional unidirectional communications channels, such as the television and radio "airwaves." Bi-directional communication takes place on the relatively narrow bandwidth network connection between the server 14 and the client 12.

Although specific embodiments of, and examples for, the presentation apparatus, article and method are described herein for illustrative purposes, various equivalent modifications can be made without departing from the spirit and scope of the invention. As will be recognized by those skilled in the relevant art, the teachings provided herein of the invention can be applied to other presentation systems, not necessarily the exemplary web based audio/visual presentation system generally described above. For example, the presentation system can employ other communications channels and/or networks. The presentation system can also employ a self-contained device, such as a DVD player, DVD-ROM player, CD-ROM player, or electronic book. While shown as web pages, the selection and presentation screens can take the form of non-web based user input screens such as those forming the standard user interface of the particular computing device.

The various embodiments described above can be combined to provide further embodiments. For example, the various methods of selecting characters (e.g., "character selection" icons, on-screen pointer, "character selection" web page) can each be combined with the various presentation operating modes (e.g., icon cue, pause and wait, pause and continue) to produce at least nine separate variations. Aspects of the invention can be modified, if necessary, to employ systems, circuits and concepts of the various patents, applications and publication to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all presentation systems that operate in accordance with the claims. Accordingly, the invention is not limited by the disclosure, but instead its scope is to be determined entirely by the following claims.

We claim:

1. A method of storytelling in an interactive system, comprising:

presenting a narrative comprising a series of events and including a number of characters, the series of events presented in a predefined order with respect to one another;

providing an indication-to a user of an availability of information regarding at least one mental impression of at least a first one of the number of characters at predetermined points during the presentation of the narrative;

interrupting the presentation of the narrative in at least one point, in response to at least one user input; and presenting the information regarding the at least one mental impression of the first one of the number of characters during the interruption of the presentation of the narrative, wherein the presented information is based at least in part on an identity of the first one of the characters and on the point of the interruption of the presentation of the narrative;

continuing the presenting of the narrative after presenting the information regarding the at least one mental impression of the first one of the characters during the interruption of the presentation of the narrative.

2. The method of claim 1 wherein providing an indication to a user of an availability of information comprises:

displaying an icon on a display at the predetermined points during the presentation of the narrative.

3. The method of claim 1 wherein providing an indication to a user of an availability of information comprises:

pausing the presentation of the narrative for a set period of time at the predetermined points during the presentation of the narrative.

4. The method of claim 1 wherein providing an indication to a user of an availability of information comprises:

pausing the presentation of the narrative for an indeterminate length of time at the predetermined points during the presentation of the narrative.

5. The method of claim 1 wherein providing an indication to a user of an availability of information comprises:

for each of a number of displayed user selectable icons corresponding to respective ones of the characters, changing a visual feature of the icon if the information regarding the at least one mental impression is available for the character that the user selectable icon represents.

6. The method of claim 1, further comprising:

presenting a number of user selectable icons during the interruption in the presentation of the narrative, the user selectable icons corresponding to respective ones of at least some of the characters in the narrative and to respective ones of a number of time frames with respect to the point of interruption of the presentation of the narrative.

7. The method of claim 1, further comprising:

presenting a non-fictional analysis of the mental impression of the first one of the number of characters after the presenting the information regarding at least the one mental impression of the first one of the characters and before continuing the presenting of the narrative.

8. The method of claim 1, further comprising:

presenting information regarding at least one mental impression of a second one of the number of characters during the interruption of the presentation of the narrative in response to an additional user input before continuing the presenting of the narrative, wherein the presented information is based at least in part on an identity of the second one of the characters and on the point of the interruption of the presentation of the narrative.

9. A method of storytelling in an interactive system, comprising:

presenting a narrative comprising a series of events and including a number of characters, the series of events presented in a predefined order with respect to one another;

interrupting the presentation of the narrative in at least one point, in response to at least one user input;

presenting information regarding at least one mental impression of a first one of the number of characters during the interruption of the presentation of the narrative, wherein the presented information is based at least in part on an identity of the first one of the characters and on the point of the interruption of the presentation of the narrative; and continuing the presenting of the narrative after presenting the information regarding the at least one mental impression of the first one of the characters during the interruption of the presentation of the narrative.

10. The method of claim 9, further comprising:

receiving the at least one user input in the form of a character selection that identifies the first one of the characters.

11. The method of claim 9, further comprising:

receiving the at least one user input in the form of a character selection and a time frame selection, wherein the character selection identifies the first one of the characters and the time frame selection identifies one of a past mental impression, a present mental impression and a future mental impression of the first character with respect to the point of interruption of the presentation of the narrative, and wherein the presented information is further based on the time frame selection.

12. The method of claim 9 wherein the order of presentation of the events is predefined at a start of the presentation of the narrative.

13. The method of claim 9 wherein the order of presentation of the events is predefined at a start of the presentation of the narrative and the events are in a non-chronological order with respect to one another.

14. The method of claim 9 wherein a direction of the order of presenting the events is user selectable during the presentation of the narrative.

15. The method of claim 9 wherein information regarding the at least one mental impression is presented as an event.

16. The method of claim 9 wherein presentation of the events comprises a series of images.

17. The method of claim 9 wherein presentation of the events comprises a series of sounds.

18. The method of claim 9 wherein presentation of the events comprises a series of images and a series of sounds related to the images.

19. A method of storytelling in an interactive system, comprising:

presenting a narrative comprising an ordered series of events and including a number of characters;

receiving a user input identifying one of the characters; and presenting information regarding a mental impression of the identified character in response to the user input, wherein the information presented is based at least in part on the point in the narrative at which the user input is received.

20. The method of claim 19 wherein the number of characters is equal to one, and the character is anthropomorphic.

21. The method of claim 19, further comprising:

interrupting the presentation of the narrative in at least one point to present the information regarding the mental impression of the identified character.

22. The method of claim 19 wherein the user input identifying one of the characters comprises a selection of an image of the character.

23. The method of claim 19 wherein the user input identifying one of the characters comprises a selection of an icon representing the character.

24. A method of creating a story for an interactive system, comprising:

creating a narrative comprising an ordered series of events and including a number of characters;

creating a record of mental impression information for at least one of the characters in the narrative, the record including a number of sets of mental impression information that relate a number of mental impressions of the character at a number of different points of the narrative; and mapping the sets of mental impression information in the record of mental impression information for the character to the respective different points of the narrative by forming a user selectable link linking the point in the narrative and the character with the associated set of mental impression information such that each of the sets of mental impression information is associable with a user identification of the character at a selected point of the narrative.

25. A method of storytelling in an interactive system, comprising:

presenting a narrative comprising an ordered series of events and including a number of characters;

receiving a user input identifying one of the characters;

presenting information regarding a mental impression of the identified character in response to the user input, wherein the information presented is based at least in part on the point in the narrative at which the user input is received and wherein the received user input further identifies one of a past time frame, a present time frame, and a future time frame with respect to a point in the presentation of the narrative at which the user input is received, and wherein the information presented is further based at least in part on the one of the past time frame, the present time frame, and the future time frame identified by the user input.

26. A method of storytelling in an interactive system, comprising:

presenting a narrative comprising an ordered series of events and including a number of characters;

receiving a user input identifying one of the characters;

receiving a second user input identifying one of a past time frame, a present time frame, and a future time frame with respect to a point in the presentation of the narrative at which the user input is received; and presenting information regarding a mental impression of the identified character in response to the user input, wherein the information presented is based at least in part on the point in the narrative at which the user input is received, and wherein the information presented is further based at least in part on the one of the past time frame, the present time frame, and the future time frame identified by the second user input.

27. A method of creating a story for an interactive system, comprising:

creating a narrative comprising an ordered series of events and including a number of characters;

creating a record of mental impression information for at least one of the characters in the narrative, the record including number of sets of mental impression information that relate a number of mental impressions of the character at a number of different points of the narrative; and mapping the sets of mental impression information in the record of mental impression information for the character to the respective different points of the narrative such that each of the sets of mental impression information is associable with a user identification of the character at a selected point of the narrative.

28. A method of creating a story for an interactive system, comprising:

creating a narrative comprising an ordered series of events and including a number of characters;

creating a record of mental impression information for at least one of the characters in the narrative, the record including number of sets of mental impression information that relate a number of mental impressions of the character for each of a past perspective, a present perspective and a future perspective of the character at each of the different points of the narrative; and mapping the sets of mental impression information in the record of mental impression information for the character to the respective different points of the narrative such that each of the sets of mental impression information is associable with a user identification of the character at a selected point of the narrative.

29. A computer-readable media whose contents cause an interactive computer system to present a story by:

presenting a narrative comprising an ordered series of events and including a number of characters;

receiving a user input identifying one of the characters during the presentation of the narrative; and interrupting the presentation of the narrative in at least one point, in response to at least one user input;

presenting information regarding a mental impression of the identified character in response to the user input during the interruption of the presentation of the narrative, wherein the information presented is based at least in part on the point in the narrative at which the user input is received.

30. A computer-readable media whose contents cause an interactive computer system to present a story by:

number of presenting a narrative comprising an ordered series of events and including a number of characters;

receiving a user input identifying one of the characters during the presentation of the narrative;

interrupting the presentation of the narrative in at least one point, in response to at least one user input;

presenting information regarding a mental impression of the identified character in response to the user input during the interruption of the presentation of the narrative, wherein the information presented is based at least in part on the point in the narrative at which the user input is received; and basing the presented information regarding the mental impression of the identified character at least in part on a user identified time frame, that identifies a chronological occurrence of the mental impression of the identified character with respect to a point of interruption in the presentation of the narrative.

31. An interactive system to present a story, comprising:

a story presentation subsystem that presents a narrative in the form of a series of events in a predefined order with respect to one another and including a number of characters; and a character analysis subsystem that interrupts the presentation of the narrative and presents a mental impression of a selected one of the characters in the narrative in response to at least one user input.

32. The interactive system of claim 31 wherein the character analysis subsystem selects the mental impression to present based at least in part on a point at which the narrative is interrupted.

33. The interactive system of claim 31 wherein the character analysis subsystem selects.the mental impression to present based at least in part on a user selected character time frame reference with respect to a point at which the narrative is interrupted.

34. A method of storytelling in an interactive system, comprising:

presenting a narrative comprising a series of events and including a number of characters, the series of events presented in a predefined order with respect to one another;

interrupting the presentation of the narrative in at least one point, in response to at least one user input; and presenting at least a first set of non-fictional analysis information regarding a mental impression of at least a first one of the number of characters during the interruption of the presentation of the narrative, wherein the presented first set of non-fictional analysis information is based at least in part on an identity of the first one of the characters and on the point of the interruption of the presentation of the narrative.

35. The method of claim 34, further comprising:

presenting information regarding at least one mental impression of the first one of the characters during the interruption of the presentation of the narrative and before presenting the first set of non-fictional analysis information.

36. The method of claim 34 wherein the first set of non-fictional analysis information includes non-fictional psychological background information corresponding to a set of facts about the first one of the characters.

37. The method of claim 34 wherein the first set of non-fictional analysis information includes non-fictional psychological background information and an application of the non-fictional psychological background information to a set of fictional facts about the first one of the characters.

38. A method of automated story presentation, comprising:

presenting at least a portion of a narrative comprising an ordered series of events and including a number of characters and a first level of information regarding a number of mental impressions of the characters;

receiving one or more user selections that identify at least one of a character, a point in the narrative and a time frame for the mental impression information with respect to the identified point in the narrative; and presenting a second level of information regarding the mental impressions for at least one of the number of characters in response to the one or more received user selections.

39. The method of claim 38 wherein presenting at least a portion of a narrative includes providing a signal encoding the narrative to a first user device; and presenting a second level of information regarding the mental impressions for at least one of the number of characters in response to the one or more received user selections includes providing a signal encoding the second level of information to a second user device, different from the first user device.

40. The method of claim 38 wherein presenting at least a portion of a narrative includes providing a signal encoding the narrative to a television; and presenting a second level of information regarding the mental impressions for at least one of the number of characters in response to the one or more received user selections includes providing a signal encoding the second level of information to a computer.

41. The method of claim 38 wherein presenting at least a portion of a narrative includes presenting the entire narrative before presenting the second level of information regarding the mental impressions for at least one of the number of characters.

* * * * *

UNITED STATES PATENT AND TRADEMARK OFFICE
CERTIFICATE OF CORRECTION

PATENT NO. : 6,544,040 B1
DATED : April 8, 2003
INVENTOR(S) : Cynthia P. Brelis et al.

It is certified that error appears in the above-identified patent and that said Letters Patent is hereby corrected as shown below:

Column 13,
Line 59, "an indication-to" should read as -- an indication to --.

Column 17,
Line 27, "number of presenting a narrative" should read as -- presenting a narrative --.
Line 58, "selects.the mental impression" should read as
-- selects the mental impression --.

Signed and Sealed this

Twenty-first Day of October, 2003

JAMES E. ROGAN
*Director of the United States Patent and Trademark Office*